US011686807B2

(12) United States Patent
Romme et al.

(10) Patent No.: US 11,686,807 B2
(45) Date of Patent: Jun. 27, 2023

(54) METHOD OF WIRELESS RANGING

(71) Applicant: Stichting IMEC Nederland, Eindhoven (NL)

(72) Inventors: Jac Romme, Schiedam (NL); Pouria Zand, Eindhoven (NL)

(73) Assignee: Stichting IMEC Nederland, Eindhoven (NL)

( * ) Notice: Subject to any disclaimer, the term of this patent is extended or adjusted under 35 U.S.C. 154(b) by 433 days.

(21) Appl. No.: 16/845,352

(22) Filed: Apr. 10, 2020

(65) Prior Publication Data
US 2020/0326403 A1 Oct. 15, 2020

(30) Foreign Application Priority Data

Apr. 10, 2019 (EP) .................................... 19168443

(51) Int. Cl.
*G01S 5/02* (2010.01)
(52) U.S. Cl.
CPC .......... *G01S 5/0246* (2020.05); *G01S 5/0284* (2013.01); *G01S 5/02216* (2020.05); *G01S 5/02685* (2020.05)
(58) Field of Classification Search
None
See application file for complete search history.

(56) References Cited

U.S. PATENT DOCUMENTS

| 5,220,332 A | 6/1993 | Beckner et al. | |
|---|---|---|---|
| 2010/0167662 A1* | 7/2010 | Kluge | G01S 11/02 455/67.16 |
| 2019/0005753 A1* | 1/2019 | Leconte | B60R 25/245 |
| 2020/0264297 A1* | 8/2020 | El Soussi | G01S 13/825 |

OTHER PUBLICATIONS

European Search Report, European Patent Application No. 19168443. 0, dated Sep. 25, 2019, 10 pages.
Jiang, Yi, and Victor CM Leung. "An asymmetric double sided two-way ranging for crystal offset." In 2007 International Symposium on Signals, Systems and Electronics, pp. 525-528. IEEE, 2007.
Kluge, Wolfram and Eggert, Dietmar, "Project: IEEE P802.15 Working Group for Wireless Personal Area Networks (WPANs)", Submission Title: "Ranging with IEEE 802.15.4 Narrow-Band PHY", dated Sep. 14, 2009, 21 pages.

* cited by examiner

*Primary Examiner* — Whitney Moore
(74) *Attorney, Agent, or Firm* — McDonnell Boehnen Hulbert & Berghoff LLP

(57) ABSTRACT

A method of wireless ranging between an initiator node and a responder node, involves performing a measurement procedure resulting in a two-way phase measurement between an initiator node and a responder node, the measurement procedure involving the initiator node transmitting an initiator carrier signal; the responder node performing a phase measurement of the initiator carrier signal relative to a responder node clock reference; the responder node transmitting a responder carrier signal; and the initiator node performing a phase measurement of the responder carrier signal relative to the initiator node clock reference, the method further involving calculating a distance between the initiator node and the responder node using as input the two-way phase measurements for the plurality of nominal frequencies; and a clock reference offset correction of the initiator node and of the responder node.

20 Claims, 5 Drawing Sheets

METHOD OF WIRELESS RANGING

CROSS-REFERENCE TO RELATED APPLICATIONS

The present application is a non-provisional patent application claiming priority to European Patent Application No. EP19168443.0, filed Apr. 10, 2019, the contents of which are hereby incorporated by reference.

FIELD OF THE DISCLOSURE

The present disclosure relates to methods and devices for wireless ranging.

BACKGROUND

Ranging involves determining the distances between wireless nodes.

Multi-carrier Phase Difference Ranging (MCPD) is a method used to estimate the distance between two wireless nodes based on phase difference of two or more carrier signals. It may be implemented in narrow-band systems like Bluetooth, Bluetooth Low Energy (BLE), IEEE 802.15.4 (e.g., Zigbee), and others. An example implementation of such a method is disclosed in W. Kluge and D. Eggert, "Ranging with IEEE 802.15.4 narrowband PHY", IEEE P802.15 Working Group for Wireless Personal Area Networks (WPANs), September 2009, https://mentor.ieee.org/802.15/dcn/09/15-09-0613-01-004franging-with-ieee-802-15-4-narrow-band-phy.ppt.

SUMMARY

The present disclosure provides methods and devices for wireless ranging with improved accuracy.

According to a first aspect of the present disclosure, there is provided a method of wireless ranging between an initiator node and a responder node, comprising, for each nominal frequency in a plurality of nominal frequencies, performing a measurement procedure resulting in a two-way phase measurement between the initiator node the responder node, the measurement procedure comprising the initiator node transmitting an initiator carrier signal, the frequency of the initiator carrier signal being derived from an initiator node clock reference; the responder node performing a phase measurement of the initiator carrier signal relative to a responder node clock reference; the responder node transmitting a responder carrier signal, the frequency of the initiator carrier signal being derived from the responder clock reference; and the initiator node performing a phase measurement of the responder carrier signal relative to the initiator node clock reference, the method further comprising calculating a distance between the initiator node and the responder node using as input the two-way phase measurements for the plurality of nominal frequencies; and a clock reference offset correction of the initiator node and of the responder node.

With "carrier signal" should be understood a continuous-wave sinusoidal oscillation with a single frequency-component (neglecting harmonics and other imperfections). Such a signal may typically originate directly from the local oscillator (LO) of the transmitting node. However, as an example, it can also be obtained by applying a constant modulation, such as a frequency shift keying (FSK) modulation with a constant input (all 1s or 0s).

The terms "initiator node" and "responder node" should be understood as labels for the functions the nodes perform with respect to the present disclosure, rather than as designating permanent functions for the respective nodes in the wireless network. For example, a node at one point acting as an "initiator node" according to the present disclosure may at some other point act as a "responder node", or vice versa. Further, with "initiator node" should be understood a node that performs the first carrier transmission during the measurement procedure, regardless of whether a decision to start the measurement procedure or the ranging originated in that node or elsewhere.

With clock reference should be understood any device providing a reference for the frequency of the transmitted carrier signal.

Typically, the clock reference also provides a reference of the timing of such transmissions and of the phase measurements.

Typically, but not necessarily, the clock reference is a crystal reference.

Performing a phase measurement relative to a clock reference should be understood to include, but not be limited to, performing the phase measurement relative to a reference signal which in turn, either indirectly or directly, has been derived from the clock reference, for example in generating internal frequencies used in downmixing in conjunction with the phase measurement.

With clock reference offset correction should be understood a correction to the calculated distance for effects of the clock reference at the initiator node and at the responder node deviating from their nominal values. Mathematically, this may for example be applied as a separate correction to a calculated distance, for example as a subtractive correction, or as a pre-distortion to the two-way phase measurements before calculating a distance.

The phase measurements may for example be performed by collecting real (I) and imaginary (Q) samples from the received carrier signal.

The clock reference offset correction may be measured and/or derived in conjunction with the measurement procedure, either before or after, for example through a carrier frequency offset (CFO) measurement. Alternatively, it may be known beforehand, for example from an earlier ranging procedure involving one or more of the initiator node and the responder node and for example stored in a database or transient or non-transient storage medium.

Using a clock reference offset correction as input to the distance calculation for correction of effects of clock reference offsets on the calculated distance allows for the use of regular algorithms for distance calculation based on two-way phase measurements (MCPD) without any extra phase measurements. Further, it allows accurate distance determination without performing complicated calibrations, such as crystal tuning, or the use of more expensive and/or power-consuming clock references. Thus, cost and energy are saved. In particular, it allows accurate ranging using devices controlled by less accurate low-cost crystals, such as low-cost narrowband radios developed for e.g. Bluetooth Low Energy (BLE) and IEEE 802.15.4 (e.g., Zigbee). Such standards have been developed with low-cost in mind. As a result, the standards allow for the crystal offset, expressed in part-per-million (ppm), to deviate from −20 ppm to +20 ppm (IEEE 802.15.4) or even from −40 ppm to +40 ppm (BLE), reducing the overall Bill-of-Materials (BoM). In such standards, MCPD ranging is especially attractive since it allows for accurate ranging while it can be used realized using commercially-of-the-shelf radios.

The present disclosure relies at least in part on the realization that crystal offsets of the initiator and reflector represent an additional significant bias during MCPD ranging with such devices, where the error can be as much as −2 to +2 meters or more depending on the timing.

With the present disclosure, the cost advantage mentioned above can be retained, while the problem of less accurate ranging due to the resulting crystal offset is mitigated.

Compared to methods depending on crystal tuning, the need for tunable crystals and for network-wide tuning or tuning redone for each possible initiator-responder pair is avoided.

Further, the present disclosure allows for a method with low computational load.

According to an embodiment, the clock reference offset correction is based on a relative clock reference offset difference $\eta_r - \eta_i$ between a relative clock reference offset $\eta_i$ of the initiator node clock reference and a relative clock offset $\eta_r$ of the responder node clock reference.

The relative clock reference offset $\eta$ should be understood as the offset the rate of the clock reference from a reference value, expressed as a ratio to a reference value subtracted by 1. For example, if a crystal frequency is offset from the reference value by 1 ppm, $\eta = 10^{-6}$.

In the common case of the same clock reference controlling both the transmitted carrier frequencies and the timing of the phase measurements performed in each of the initiator node and the responder node, it has been found that the correction to the calculated distance, to an approximation, can be expressed as a function only of only nominal (i.e., ideal, unaffected by clock reference offset) values for the carrier frequencies, of nominal values for the timing of the phase measurements and of the relative clock reference offset. During the ranging procedure the former two are known in advance, or the initiator node and the reflector only agree on the nominal (targeted) frequencies used as well as the nominal (targeted) timing of events. Hence, if the device computing the distance (typically the initiator node) knows all these parameters it can predict the bias and compensate for it. The only experimental parameter is the relative clock reference offset difference. Thus, the correction can be expressed in terms of only this one experimental parameter, leading to low complexity and therefore low cost, while retaining high accuracy.

Due to the small values of $\eta$, to an approximation, several definitions of the reference value are equivalent when calculating the relative clock reference offset difference $\eta_r - \eta_i$, which can be regarded as the offset of the responder node clock reference with respect to the initiator clock reference. For example, both $\eta_r$ and $\eta_i$ may be expressed with respect to an absolute, perfect, reference. Alternatively, and equivalently according to an approximation, $\eta_r$ and $\eta_i$ may be expressed relative to the clock reference of one of the initiator node or the responder node, so that, for example, only a measurement of the offset of the reference node clock offset relative to the initiator node clock offset may be taken.

According to an embodiment, the clock reference offset, with the approximation mentioned above, as a correction to the distance, may be written:

$$e_r = \alpha_f T_f + \alpha_o T_o, \text{ with}$$

$$\alpha_f = -\frac{c_0}{2}\left((\eta_r - \eta_i)^2\left(\frac{f_c}{\Delta_f} + K_f\right) + (\eta_r - \eta_i)\frac{F}{\Delta_f}\right) \text{ and}$$

$$\alpha_o = -\frac{c_0}{2}(\eta_r - \eta_i),$$

wherein $e_r$ is the correction to the distance, $T_f$ is a nominal time difference between successive phase measurements made at the initiator node or at the responder node, $T_o$ is a nominal time difference between, for a given nominal frequency of the plurality of nominal frequencies, the phase measurement at the responder node and the phase measurement at the initiator node, $\eta_r$ is a relative clock reference offset of the responder node clock reference, $\eta_i$ is a relative clock reference offset of the initiator node clock reference, $f_c$ is a nominal starting frequency of the plurality of nominal frequencies, $\Delta_f$ is a nominal frequency step in the plurality of nominal frequencies, assuming a constant frequency stepping, $K_f$ is the number of frequencies in the plurality of nominal frequencies, F is an optional pre-programmed nominal frequency offset, and $c_0$ is a signal propagation speed.

Throughout this disclosure, when it is stated that a quantity "may be written" according to a certain mathematical formula, it will be understood to cover any mathematically equivalent calculation no matter the actual representation used.

According to a different embodiment, without the approximation, the correction to the distance may be written:

$$e_r = \alpha_f T_f + \alpha_o T_o, \text{ with}$$

$$\alpha_f = -\frac{c_0}{2}\left((\eta_r - \eta_i)^2\left(\frac{f_c}{\Delta_f} + K_f\right) + (1 + \eta_r)(\eta_r - \eta_i)\frac{F}{\Delta_f}\right) \text{ and}$$

$$\alpha_o = -\frac{c_0}{2}(1 + \eta_r)(\eta_r - \eta_i),$$

wherein $e_r$ is the correction to the distance, $T_f$ is a nominal time difference between successive phase measurements made at the initiator node or at the responder node, $T_o$ is a nominal time difference between, for a given nominal frequency of the plurality of nominal frequencies, the phase measurement at the responder node and the phase measurement at the initiator node, $\eta_r$ is a relative clock reference offset of the responder node clock reference, $\eta_i$ is a relative clock reference offset of the initiator node clock reference, $f_c$ is a nominal starting frequency of the plurality of nominal frequencies, $\Delta_f$ is a nominal frequency step in the plurality of nominal frequencies, assuming a constant frequency stepping, $K_f$ is the number of frequencies in the plurality of nominal frequencies, F is an optional pre-programmed nominal frequency offset, and $c_0$ is a signal propagation speed.

In some examples, the accuracy is greater than the mentioned approximation, by utilizing separate knowledge and measurement of the relative clock reference offset of the responder node clock reference and the relative clock reference offset of the initiator node clock reference.

According to an embodiment, the method further comprises one of the initiator node or the responder node performing a carrier frequency offset (CFO) measurement on a carrier signal transmitted by the other of the initiator node and the responder node; and deriving the relative clock reference offset difference from the CFO.

This is a straightforward way of deriving the relative clock reference offset difference.

Alternatively, according to an embodiment, the method further comprises one of the initiator node or the responder node performing a time offset difference (TOD) measurement on a message transmitted by the other of the initiator node and the responder node; and deriving the clock reference offset difference from the TOD.

According to an embodiment, the calculating of the distance comprises calculating a preliminary distance between the initiator node and the responder node based on the plurality of nominal frequencies; and calculating a corrected distance between the initiator node and the responder node based on the nominal distance and the clock reference offset correction.

In some embodiments, the preliminary distance may be calculated using nominal values of the phase measurements. Then, the correction can be applied as a single scalar additive number. This reduces complexity.

According to an embodiment, the calculating of the distance comprises calculating a pre-distortion for the two-way phase measurements based on the clock reference offset correction; forming a pre-distorted set of two-way phase measurements by applying the pre-distortion to the two-way phase measurements; calculating the distance between the initiator node and the responder node based on the pre-distorted set of two-way phase measurements.

This introduces an additional degree of freedom, since the compensation can be applied for each nominal frequency individually. This allows for improved ranging accuracy in the case of using a variable frequency step or random frequency hopping instead of a linear stepping of frequencies (constant frequency step). This approach may additionally be desired when the timing of the phase measurement may differ frequency by frequency, for example when performing ranging between three or more of nodes (e.g., group ranging), wherein, in the case of large-scale or dense deployments when the gap between the phase measurement at the initiator node and the phase measurement at the responder node will increase and/or vary.

According to an embodiment, the initiator node clock reference and the responder node clock reference each is controlled by a crystal. This allows for a cheap construction whose drawbacks of lower clock reference accuracy may be mitigated well by the present disclosure.

According to an embodiment, in the initiator node and in the responder node, a respective same clock reference controls both a clock timing the phase measurements and a local oscillator, LO.

This reduces complexity while at the same time allowing for the correction according to the present disclosure to be made in an efficient way.

According to an embodiment, the initiator node and the responder node are Bluetooth Low Energy (BLE) devices. This is a technology with demand for low-power, low-cost devices for which the present disclosure is particularly suitable.

According to an embodiment, the initiator node and the responder node are IEEE 802.15.4, devices, such as Zigbee devices. This, too, is a technology with demand for low-power, low-cost devices for which the present disclosure is particularly suitable.

According to a second aspect of the present disclosure, there is provided a method of wireless ranging between an initiator node and a responder node, comprising gathering results from two-way phase measurements between an initiator node and a responder node for each nominal frequency in a plurality of nominal frequencies, calculating a distance between the initiator node and the responder node using as input the results from the two-way phase measurements; and a clock reference offset correction of the initiator node and of the responder node.

Effects and features of this second aspect are largely analogous to those described above in connection with the first aspect. Embodiments mentioned in relation to the first aspect are largely compatible with this second aspect.

According to a third aspect of the present disclosure, there is provided a wireless ranging device configured to gather results from two-way phase measurements between an initiator node and a responder node for each nominal frequency in a plurality of nominal frequencies, calculate a distance between the initiator node and the responder node using as input the results from the two-way phase measurements; and a clock reference offset correction of the initiator node and of the responder node.

Effects and features of this third aspect are largely analogous to those described above in connection with the first and second aspects. Embodiments mentioned in relation to the first and second aspects are largely compatible with this third aspect, and vice versa.

According to an embodiment, the wireless ranging device is the initiator node.

BRIEF DESCRIPTION OF THE FIGURES

The above, as well as additional, features will be better understood through the following illustrative and non-limiting detailed description of example embodiments, with reference to the appended drawings.

All the figures are schematic, not necessarily to scale, and generally only show parts which are necessary to elucidate example embodiments, wherein other parts may be omitted or merely suggested.

DETAILED DESCRIPTION

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

Figure 1A:
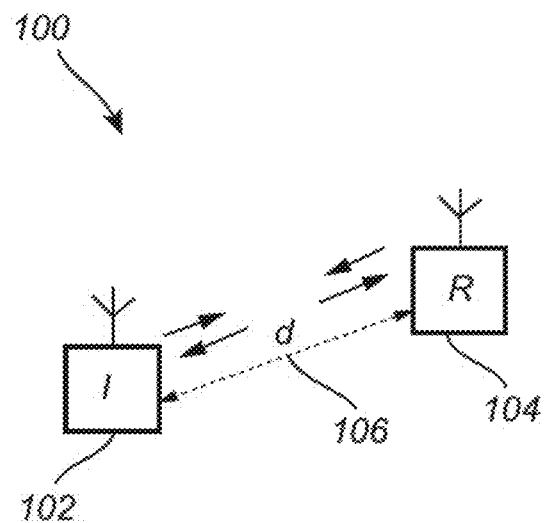
FIG. 1A shows schematically a wireless network, according to an example embodiment.

FIG. 1A shows schematically a wireless network 100. The wireless network 100 comprises for the purposes of the present disclosure an initiator node (I) 102 and a responder node (R) 104, separated by a distance d 106, which is to be determined by wireless ranging involving transmissions indicated by arrows.

Figure 1B:
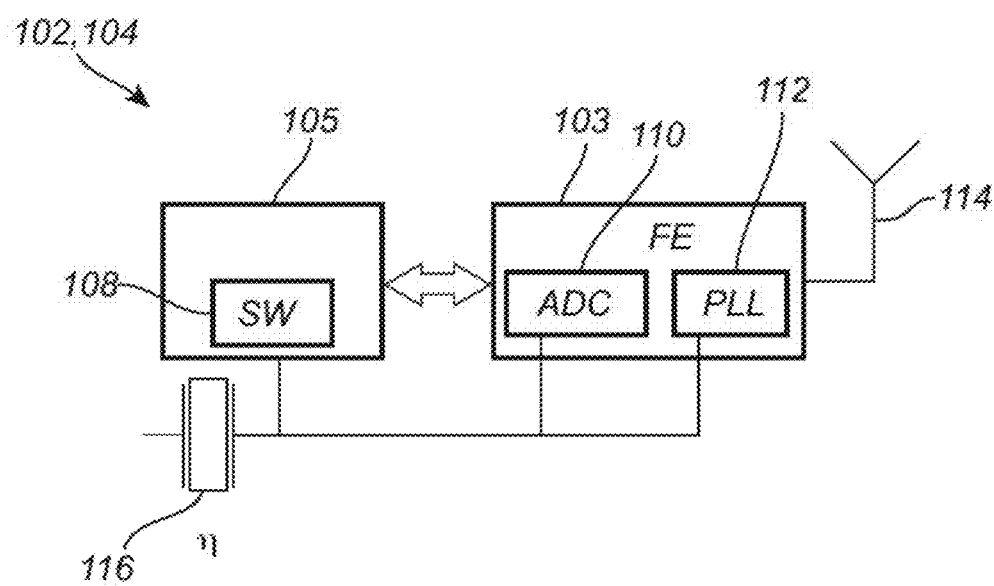
FIG. 1B shows a block diagram of a wireless network node, according to an example embodiment.

FIG. 1B shows a block diagram of a wireless network node, which may be the initiator node 102 or the responder node 104. The wireless network node may for example be a Bluetooth low-energy (BLE) device or a IEEE 802.15.4, device, such as a Zigbee device.

A processor 105, which may be a microcontroller or CPU, controls the node 102, 104 by executing software 108. The processor 105 controls a radio front end (FE) 103 comprising an analog-to-digital converter (ADC) 110 and a phased-lock loop (PLL) 112 for generating a local oscillator signal (LO) used for transmitting a carrier signal or as a reference when performing a phase measurement when receiving a carrier signal. The radio front end 103 is connected to an antenna 114 for receiving or transmitting signals.

A clock reference 116, here in the form of a crystal, provides a reference for both the processor 105 and the radio front end 103 (i.e., the same crystal to derive the RF frequencies and generate the baseband clock driving the digital circuitry). Thus, any relative offset $\eta$ in the of the clock reference 116 will affect both the timing of transmissions and measurements, as controlled by the processor 105, and of the frequencies of transmitted carrier signals and of the reference used for phase measurements, both as generated by the LO controlled by the PLL 112, in turn controlled by the clock reference 116.

Figure 2:
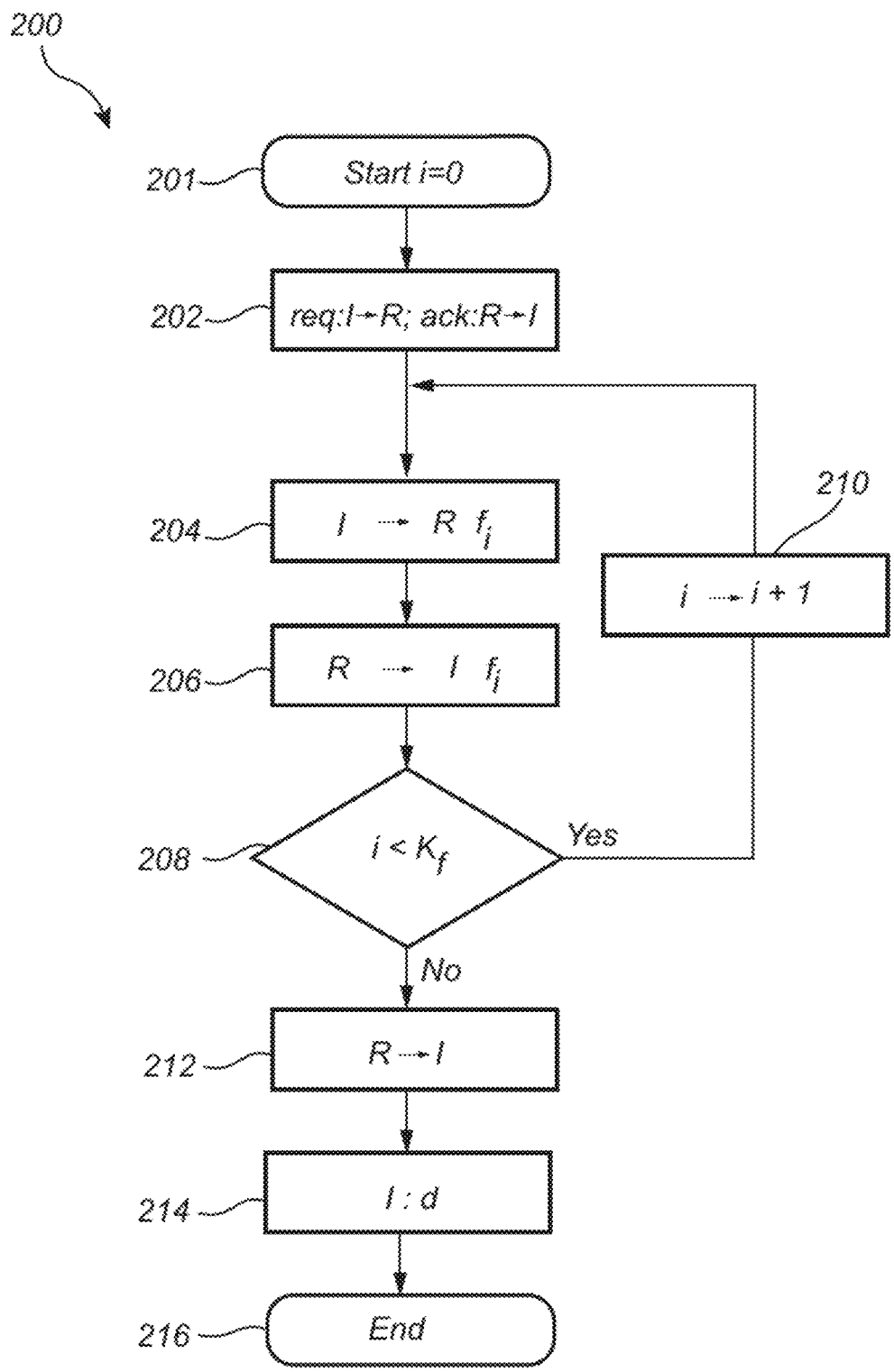
FIG. 2 is a flowchart of a method example of wireless ranging, according to an example embodiment.

FIG. 2 is a flowchart of a method example 200 of wireless ranging which may be implemented in the wireless network 100 (cf. FIG. 1).

Starting, at 201, a frequency index i may be set to zero.

At 202, the initiator node 102 may transmit a ranging request and the responder node may receive the ranging request and reply by transmitting a ranging acknowledgement. Further, a time synchronization may be performed between the clock of the initiator node 102 and the clock of the responder node 104.

Now, for each frequency $f_i$ in a plurality of frequencies $f_0$, $f_1$, $f_2$ ... $f_{K_f-1}$, a measurement procedure 204-210 is performed, resulting in a two-way phase measurement between the initiator node 102 and the responder node 104, as will be detailed in the following.

A two-way phase measurement, (i.e., a measurement of the round-trip phase advance between a first node and a second node, such as the initiator node 102 and the responder node 104) may be performed based on a combination of a phase measurement performed at the second node with the first node transmitting and a phase measurement at the first node with the second node transmitting. With the phase measurement at the second node made with respect to the second node's LO, which is also used for generating the carrier signal transmitted by the second node, and the phase measurement done at the first node made with respect to the first node's LO, which is used for generating the carrier signal transmitted by the first node any phase offset between the respective local oscillators of the two nodes will cancel out when combining the two measurements.

At 204, the initiator node 102 transmits on frequency $f_i$ an initiator carrier signal, which received by the responder node 104. The responder node 104 performs a phase measurement of the initiator carrier signal. The responder node measures the phase of the initiator carrier signal with respect to the local oscillator (LO) of the responder node.

At 206, the responder node 104 transmits on frequency $f_i$ a responder carrier signal, which is received by the initiator node 102. The initiator node 102 performs a phase measurement of the responder carrier signal.

At 208, if the measurement procedure is to be performed on further frequencies out of the total of $K_f$ frequencies, at 210, the initiator node 102 and the responder node 104 may switch to the next frequency $f_{i+1}$ and repeat the measurement procedure 204, 206. Thus, the measurement procedure is repeated several times at different frequencies.

At 212, the responder node 104 may transmit its phase measurement results for each frequency $f_i$. This transmission is received by the initiator node 102.

At 214, a wireless ranging device in the form of a calculating node, which may be the initiator node 102, may calculate the distance d between the initiator node 102 and the responder node 104 based on the gathered measurement results, which involve the two-way phase for the plurality of frequencies $f_i$. Alternatively, the calculating node may be separate and distinct from the initiator node 102. Used as input to the calculation are the phase measurement results (i.e., the two-way phase measurements for the plurality of nominal frequencies and a clock reference offset correction of the initiator node and of the responder node), as will be detailed further below.

At 216, the method example finishes.

Figure 3:
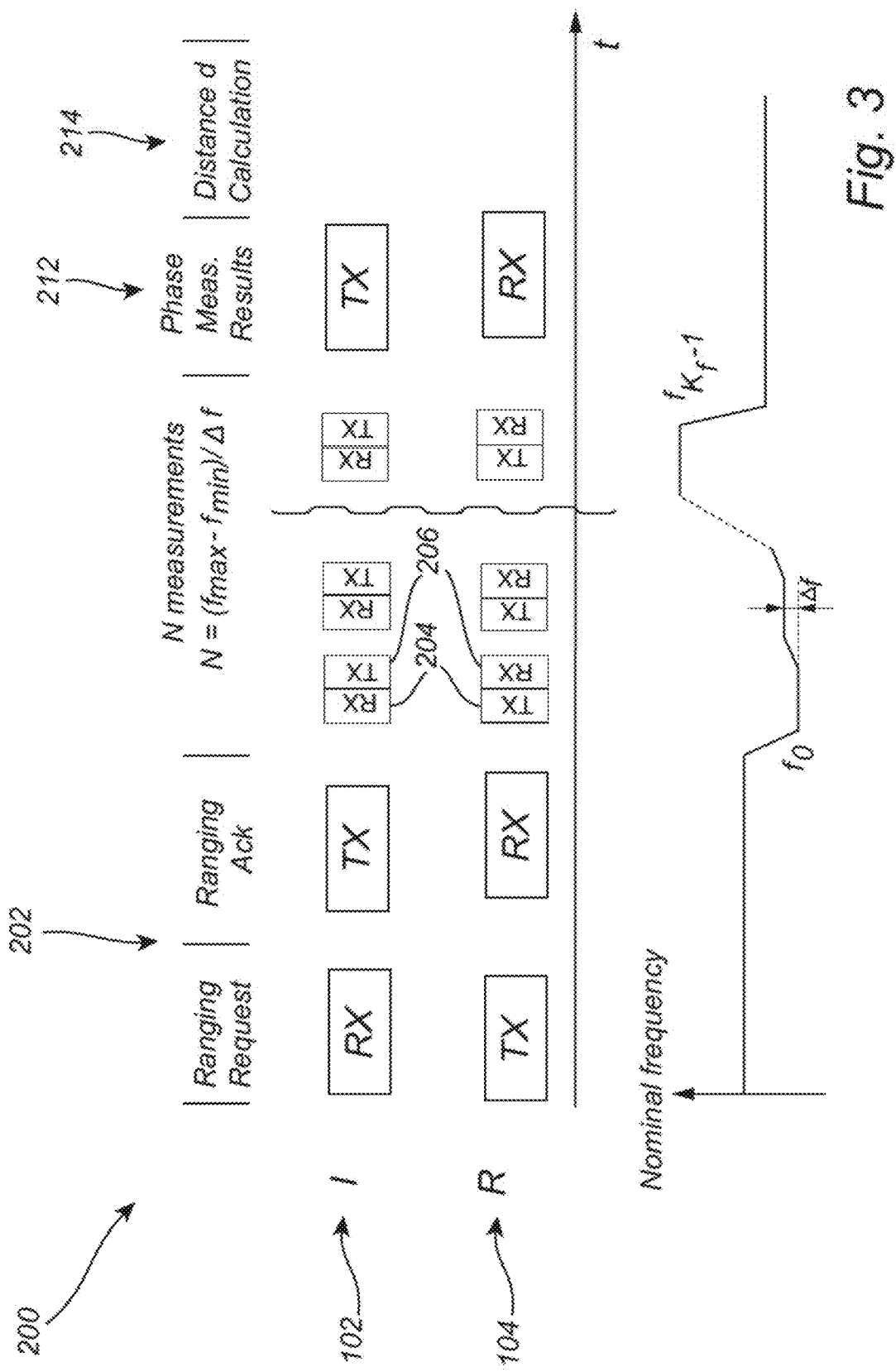
FIG. 3 is a timing diagram of transmissions by the responder node and the initiator node, according to an example embodiment.

FIG. 3 is a timing diagram of transmissions by the responder node "R" 104 and the initiator node "I" 102 during the method example 200 (cf. FIG. 2). Transmissions by each respective node are marked "TX" and reception by "RX".

Shown, at 202, are the ranging request transmission by the initiator node 102 received by the responder node 104 and the ranging acknowledgement transmission by the responder node 104 received by the initiator node 10.

Further shown, at 204, are the respective transmissions, at each frequency $f_i$, of the carrier signal from the initiator node 102, received by the responder node 104, and, at 206, the carrier signal from the responder node 104, received by the initiator node 102. As shown in the bottom of FIG. 3, in this example, the nominal frequency of transmission starts at a frequency $f_0$ increases linearly with a frequency step $\Delta_f$, ending at a frequency $f_{K_f-1}$.

Further shown, at 212 (cf. FIG. 2), is the transmission by the responder node 104 of the measurement results, received by the initiator node 102.

Finally shown, at 214 (cf. FIG. 2), is timing of the distance calculation performed by the initiator node 102.

Figure 4A:
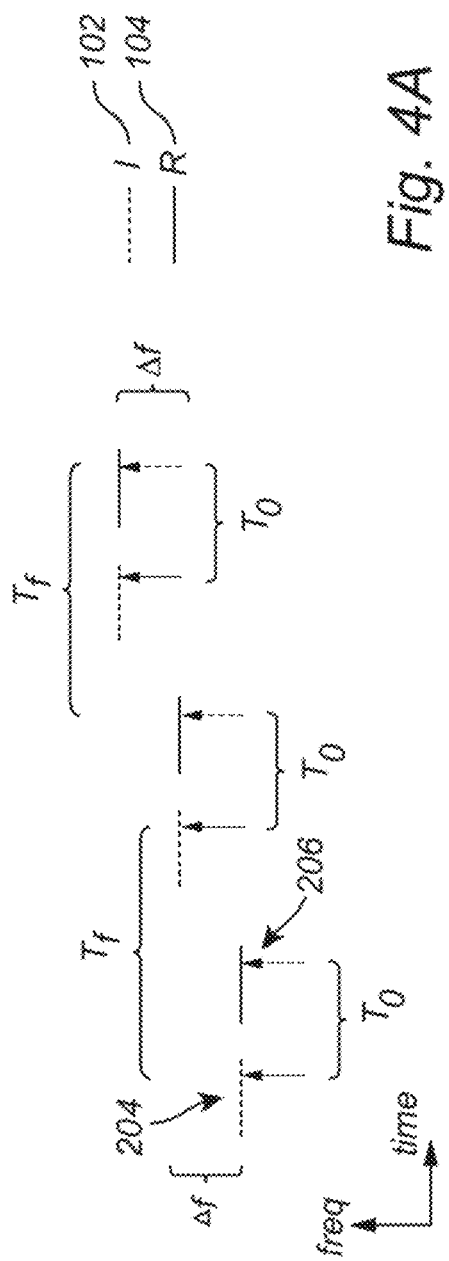
FIG. 4A is a detailed timing diagram of transmissions with nominal frequencies and phase measurement times, according to an example embodiment.

FIG. 4A is a detailed timing diagram of transmissions with nominal frequencies and phase measurement times, showing a sequence of transmissions and phase measurements, wherein transmissions by the initiator node 102 are shown with dashed lines and transmissions by the responder node 104 are shown with solid lines. Similarly, the timings of phase measurements performed by the initiator node 102 are indicated with dashed arrows and the timing of measurements performed by the responder node 104 are indicated by solid arrows.

For each nominal frequency, the phase measurement 206 by the initiator node 102 of the carrier signal transmitted by the responder node 104 is separated from the phase measurement 204 by the responder node 104 of the carrier signal transmitted by the initiator node 102 by a time interval $T_0$.

Further, for successive frequencies separated by the frequency step $\Delta_f$, the respective phase measurements 206 by the initiator node 102 of the carrier signals transmitted by the responder node 104 and the respective phase measurements 204 by the responder node 104 of the carrier signals transmitted by the responder node 104 are separated by a time interval $T_f$.

Figure 4B:
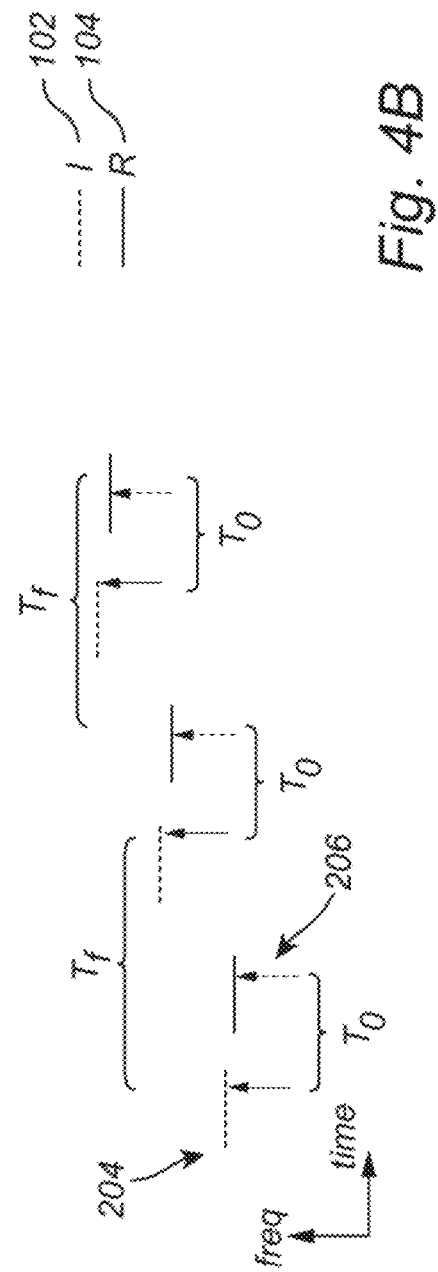
FIG. 4B is a detailed timing diagram of transmissions with example actual frequencies and phase measurement times, according to an example embodiment.

FIG. 4B is a detailed timing diagram of transmissions with example actual frequencies and phase measurement times. It illustrates, in an exaggerated manner, how, due to a relative clock reference offset $\eta_r$ of the responder node 104 clock reference 116 and a relative clock reference offset $\eta_i$ of the initiator node clock reference 116, the actual frequencies of the carrier signals transmitted by the initiator node 102 and the responder node 104 and the time intervals $T_0$ and $T_f$ deviate from their nominal values, as can be seen by the solid lines—the vertical position of which corresponding to frequencies transmitted by the initiator node 102—not perfectly lining up with the dashed lines—corresponding to frequencies transmitted by the responder node 104—and by the timing of the phase measurements—represented by the vertical arrows—not perfectly lining up with the nominal time intervals $T_0$ and $T_f$—as represented by brackets—and also moving in relation to successive transmissions.

Figure 5A:
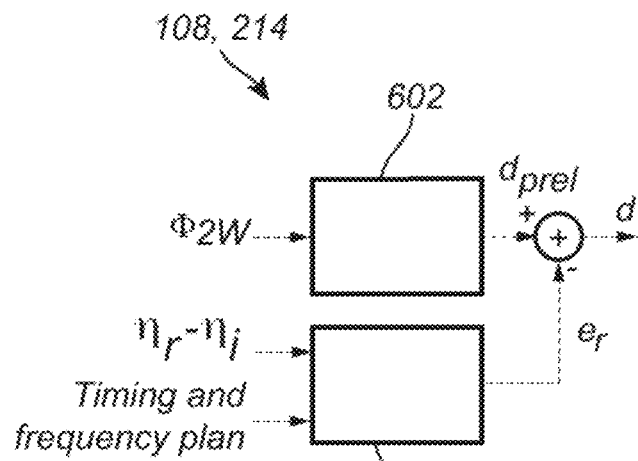
FIG. 5A is a diagram illustrating correction after calculating a preliminary distance, according to an example embodiment.

FIG. 5A is a block diagram illustrating calculating, at 214 (cf. FIGS. 2 and 3), and possibly implemented in the software 108 of the initiator node 102, the distance d between the initiator node 102 and the responder node 104 according to a first approach, wherein, based on the two-way phase measurements, represented by a vector $\Phi_{2W}$, a preliminary distance $d_{prel}$ is calculated by a ranging engine 602 using known methods. Subtracted from that preliminary distance $d_{prel}$ is a clock reference offset correction $e_r$ calculated by a bias calculator 604, having as input the relative clock reference offset difference $\eta_r - \eta_i$ and a timing and frequency plan of the measurement procedure. More in particular $e_r$ may be written:

$$e_r = \alpha_f T_f + \alpha_o T_o, \text{ with}$$

$$\alpha_f = -\frac{c_0}{2}\left((\eta_r - \eta_i)^2\left(\frac{f_c}{\Delta_f} + K_f\right) + (\eta_r - \eta_i)\frac{F}{\Delta_f}\right) \text{ and}$$

$$\alpha_o = -\frac{c_0}{2}(\eta_r - \eta_i),$$

wherein $T_f$ is the nominal time difference between successive phase measurements made at the initiator node 102 or at the responder node (cf. FIG. 4A), $T_o$ is a nominal time difference between, for a given nominal frequency of the plurality of nominal frequencies, the phase measurement at the responder node and the phase measurement at the initiator node (cf. FIG. 4A), $\eta_r$ is a relative clock reference offset of the responder node clock reference, $\eta_i$ is a relative clock reference offset of the initiator node clock reference, $f_c$ is a nominal starting frequency of the plurality of nominal frequencies, $\Delta_f$ is the nominal frequency step in the plurality of nominal frequencies (cf. FIG. 4A), $K_f$ is the number of frequencies in the plurality of nominal frequencies, F is an optional pre-programmed nominal frequency offset, and $c_0$ is a signal propagation speed.

Thus, clock reference offset correction $e_r$ is based on the relative clock reference offset difference $\eta_r - \eta_i$ between the relative clock reference offset $\eta_i$ of the initiator node clock reference and the relative clock offset $\eta_r$ of the responder node clock reference.

Thus, clock reference offset correction $e_r$ is based on the relative clock reference offset difference $\eta_r - \eta_i$ between the relative clock reference offset $\eta_i$ of the initiator node clock reference and the relative clock offset $\eta_r$ of the responder node clock reference.

In an alternative approach to the first approach, not depicted, the correction $e_r$ may be calculated as a function of the relative clock reference offset of the responder node clock reference $\eta_r$ and the relative clock reference offset of the initiator node clock reference $\eta_i$ separately, wherein $e_r$ may be written:

$$e_r = \alpha_f T_f + \alpha_o T_o, \text{ with}$$

$$\alpha_f = -\frac{c_0}{2}\left((\eta_r - \eta_i)^2\left(\frac{f_c}{\Delta_f} + K_f\right) + (1 + \eta_r)(\eta_r - \eta_i)\frac{F}{\Delta_f}\right) \text{ and}$$

$$\alpha_o = -\frac{c_0}{2}(1 + \eta_r)(\eta_r - \eta_i).$$

Figure 5B:
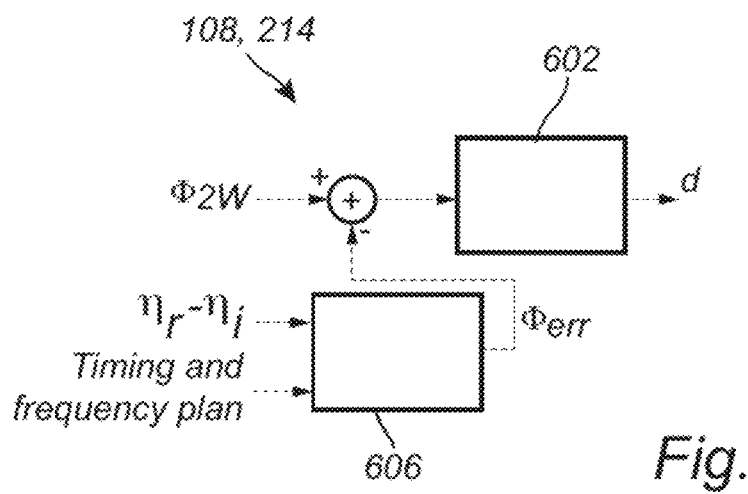
FIG. 5B is a diagram illustrating a phase-measurement pre-distortion, according to an example embodiment.

FIG. 5B is a block diagram illustrating calculating, at 214 (cf. FIGS. 2 and 3), and possibly implemented in the software 108 of the initiator node 102, the distance d between the initiator node 102 and the responder node 104 according to a second approach, wherein, pre-distortions represented by a vector $\Phi_{err}$ is calculated at 606, having as input the relative clock reference offset difference $\eta_r - \eta_i$ and a timing and frequency plan of the measurement procedure. The pre-distortions $\Phi_{err}$ are subtracted from the two-way phase measurements $\Phi_{2W}$ and the distance d is calculated by a ranging engine 602 using known methods known.

Thus, in this case, the calculating of the distance comprises calculating a pre-distortion for the two-way phase measurements based on the clock reference offset correction; forming a pre-distorted set of two-way phase measurements by applying the pre-distortion to the two-way phase measurements; calculating the distance between the initiator node and the responder node based on the pre-distorted set of two-way phase measurements.

Figure 5C:
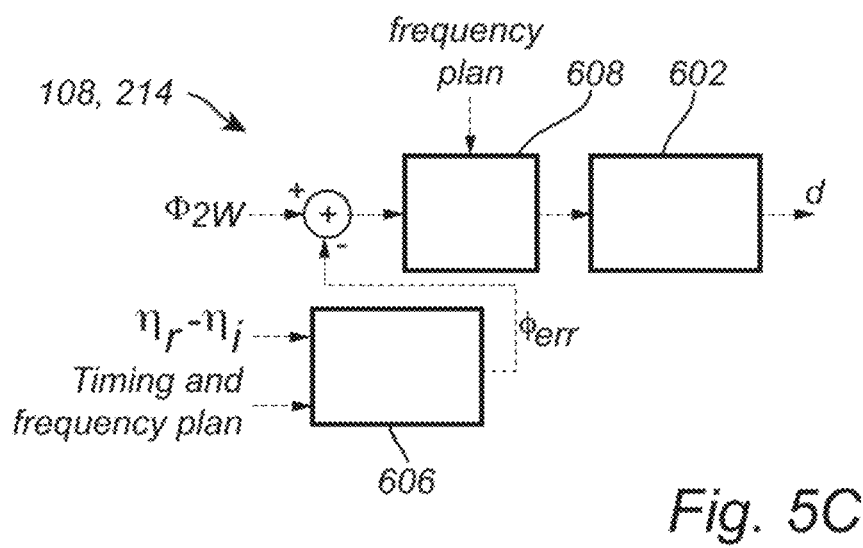
FIG. 5C is a diagram illustrating a phase-measurement pre-distortion in the case of frequency hopping, according to an example embodiment.

FIG. 5C is a block diagram illustrating calculating, at 214 (cf. FIGS. 2 and 3), and possibly implemented in the software 108 of the initiator node 102, the distance d between the initiator node 102 and the responder node 104 according to a third approach, wherein in addition to the second approach, the two-way phase measurements $\Phi_{2W}$, as modified by the pre-distortions $\Phi_{err}$, are subjected to a frequency reordering 608, having as input the frequency plan, before computation by the ranging engine 602. This allows for more flexibility in the frequency plan and/or time plan, e.g., when using frequency hopping as used in most narrowband radio standards like BLE and 802.15.4.

For example, the pre-distortion of the second approach of FIG. 5B and the third approach of FIG. 5C, assuming the use of pseudo-random frequency hopping, with the kth nominal frequency denoted by $f_k$ and the respective time at which the phase measurements are performed at the responder node 104 is $T_k$ and, as before, the phase measurement by the initiator node 102 nominally performed separated time $T_o$ from the phase measurement performed by the responder node 104, the pre-distortion $\Phi_{err}$ may be written:

$$\Phi_{err}(f_k) = -2\pi(\eta_r - \eta_i)^2 f_k T_k - 2\pi(\eta_r - \eta_i) F T_k - 2\pi(\eta_r - \eta_i) f_k T_0$$

For notational simplicity $T_o$ is here treated as a constant, however, the concept is easily generalized for other cases, such as group ranging.

In the following, the formulas disclosed above in conjunction with FIGS. 6A and 6B will be derived. It can be shown that $$\Phi_{2W}[k] = \Phi_I[k] + \Phi_R[k] = -2\pi(f_k^i + f_k^r)\frac{d}{c_0} - 2\pi(f_k^i - f_k^r)(T_k^r - T_k^i)$$

where $\Phi_{2W}[k]$ is the two-way phase measurement at nominal frequency index k obtained by summing the phase measured at the initiator node $\Phi_I[k]$ and the phase measured at the responder node $\Phi_R[k]$. Here, $f_k^i$ and $f_k^r$ are the actual frequencies generated by respectively the initiator node 102 and the responder node 104, and $T_k^i$, $T_k^r$ represent the actual time at which the phase is measured at the initiator node 102 and the responder node 104, respectively. Other symbols are defined as above.

The distance d can then be estimated by computing the phase-difference of the two-way phase measurements for consecutive frequencies.

$$d = -\frac{c_0}{2\pi\Delta_f(K_f-1)}\sum_{k=1}^{K_f-1}\Phi_{2W}[k] - \Phi_{2W}[k-1]$$

As a result, if the product of $(f_k^i-f_k^r)$ and $(T_k^r-T_k^i)$ is constant with respect to k, this term will not influence the ranging result, as it will cancel.

However, the actual frequencies and time-offset will scale in the presence of clock reference offsets. The actual frequencies will scale according to $f_k^i=(1+\eta_i)f_k$ and $f_k^r=(1+\eta_r)f_k$, where $f_k$ represents the nominal frequency having index k, with $f_k=f_c+k\Delta_f$ with $\Delta_f$ is the frequency step-size and $f_c$ is the lowest frequency used (please notice the uniform frequency stepping). For completeness, the variable F, which denotes any programmed frequency to model a software-controlled frequency offset. The measurement-timing is defined as follows; $T_k^r=(1+\eta_r)t_k$ and $T_k^i=(1+\eta_i)(t_k+T_o)$ with $(t_{k+1}-t_k)=T_f$ where $T_o$ is the time difference at which measurement is taken as the initiator and the reflector and $T_f$ is the nominal time difference between measurements taken at either the initiator or reflector, as before.

Substituting these definitions into the equation for d above yields the equations disclosed above in conjunction with FIG. 5B.

Using some typical values for BLE ($f_c$=2.4 GHz, $\Delta_f$=2 MHz, $K_f$=40), one may quantify the impact of crystal-offset on the ranging bias. Firstly, $\alpha_o$ tends to be much larger than $\alpha_f$. For instance, assuming F=0 kHz and a crystal-offset of at most +−20 ppm, it can be seen that $\alpha_o$ is at least a factor 20 larger than $\alpha_f$. In this case, $|\eta_r-\eta_i|$ is at most 40 ppm, causing the quadratic term in the expression for of to be small compared to the other terms, despite the large scaling term ($f_c/\Delta_f+K_f$=1240). As a result, the range error is more sensitive to $T_o$ than to $T_f$. Even when the crystal offset is at its highest at 40 ppm, $\alpha_o$ is still a factor 13 larger than $\alpha_f$. However, $T_f$ will be larger than $T_o$, making is still significant. Accordingly, for BLE (or other) systems, both $\alpha_f$ and $\alpha_o$ can be approximated by the equations disclosed above in conjunction with FIG. 5A.

The relative clock reference offset difference $\eta_r-\eta_i$ may be obtained by one of the initiator node 102 or the responder node 104 performing a carrier frequency offset, CFO, measurement on a carrier signal transmitted by the other of the initiator node 102 and the responder node 104 using known methods. Thereby, for example, a dedicated carrier signal may be sent, of which both the initiator and reflector know the targeted frequency ($F_t$). Assuming the initiator node 102 sends the dedicated carrier signal, the responder node 104 can measure the so-called carrier frequency offset (CFO). The CFO can be used to compute the relative clock reference offset difference $\eta_r-\eta_i$ as:

$$\eta_r - \eta_i = \frac{CFO}{F_t}.$$

This designated carrier signal for CFO measurement can be appended placed at different places in measurement procedure 200 (conf. FIGS. 2, 4). It could be derived from the ranging request packet or the ranging request acknowledgement, which are exchanged at 202 between initiator and reflector before the phase-measurements 204, 206 to exchange upcoming ranging parameters. Alternatively, a dedicated carrier signal could be placed between the ranging acknowledgement and the first carrier signal exchange of the measurement procedure 200. It could even be placed in the middle or the end of the measurement procedure 200. The CFO can be measured by either the initiator node 102 and/or the responder node 104.

Once the relative clock reference offset difference is determined, it can be communicated to the wireless node, where the distance estimate is computed 214, typically the initiator node 102.

Alternatively, the relative clock reference offset difference $\eta_r-\eta_i$ may be obtained by one of the initiator node 102 or the responder node 104 performing two or more time measurements on specific events within a single message or multiple messages transmitted by the other of the initiator node 102 and the responder node 104 (e.g., time of arrival of the synch frame delimiters or symbol timing), where the TOD(s) between these time measurements compared to the expected TOD(s) allows for an estimation of the relative reference offset difference.

In the above the disclosure has mainly been described with reference to a limited number of examples. However, as is readily appreciated by a person skilled in the art, other examples than the ones disclosed above are equally possible within the scope of the disclosure, as defined by the appended claims.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

What is claimed is:
1. A method of wireless ranging between an initiator node and a responder node, comprising:
for each nominal frequency in a plurality of different nominal frequencies, performing a measurement procedure resulting in a two-way phase measurement between the initiator node and the responder node, the measurement procedure comprising:

the initiator node transmitting an initiator carrier signal, the frequency of the initiator carrier signal being derived from an initiator node clock reference;

the responder node performing a phase measurement of the initiator carrier signal relative to a responder node clock reference;

the responder node transmitting a responder carrier signal, the frequency of the initiator carrier signal derived from the responder clock reference; and the initiator node performing a phase measurement of the responder carrier signal relative to the initiator node clock reference, the method further comprising:

calculating a distance between the initiator node and the responder node using as input:
the two-way phase measurements for the plurality of different nominal frequencies; and
a clock reference offset correction of the initiator node and of the responder node.

2. The method of claim 1, wherein the clock reference offset correction is based on a relative clock reference offset difference between a relative clock reference offset of the initiator node clock reference and a relative clock offset of the responder node clock reference.

3. The method of claim 2, further comprising:
one of the initiator node or the responder node performing a carrier frequency offset measurement on a carrier signal transmitted by the other of the initiator node and the responder node; and
deriving the relative clock reference offset difference from the carrier frequency offset.

4. The method of claim 2, further comprising:
one of the initiator node or the responder node performing a time offset difference measurement on a message transmitted by the other of the initiator node and the responder node; and
deriving the clock reference offset difference from the time offset difference.

5. The method of claim 1, wherein the clock reference offset, as a correction to the distance, may be written:

$$e_r = \alpha_f T_f + \alpha_o T_o, \text{ with}$$
$$\alpha_f = -\frac{c_0}{2}\left((\eta_r - \eta_i)^2\left(\frac{f_c}{\Delta_f} + K_f\right) + (\eta_r - \eta_i)\frac{F}{\Delta_f}\right) \text{ and}$$
$$\alpha_o = -\frac{c_0}{2}(\eta_r - \eta_i),$$

wherein $e_r$ is the correction to the distance, $T_f$ is a nominal time difference between successive phase measurements made at the initiator node or at the responder node, $T_o$ is a nominal time difference between, for a given nominal frequency of the plurality of different nominal frequencies, the phase measurement at the responder node and the phase measurement at the initiator node, $\eta_r$ is a relative clock reference offset of the responder node clock reference, $\eta_i$ is a relative clock reference offset of the initiator node clock reference, $f_c$ is a nominal starting frequency of the plurality of different nominal frequencies, $\Delta_f$ is a nominal frequency step in the plurality of different nominal frequencies, assuming a constant frequency stepping, $K_f$ is the number of frequencies in the plurality of different nominal frequencies, F is an optional pre-programmed nominal frequency offset, and $c_0$ is a signal propagation speed.

6. The method of claim 1, wherein the correction to the distance may be written:

$$e_r = \alpha_f T_f + \alpha_o T_o, \text{ with}$$
$$\alpha_f = -\frac{c_0}{2}\left((\eta_r - \eta_i)^2\left(\frac{f_c}{\Delta_f} + K_f\right) + (1 + \eta_r)(\eta_r - \eta_i)\frac{F}{\Delta_f}\right) \text{ and}$$
$$\alpha_o = -\frac{c_0}{2}(1 + \eta_r)(\eta_r - \eta_i),$$

wherein $e_r$ is the correction to the distance, $T_f$ is a nominal time difference between successive phase measurements made at the initiator node or at the responder node, $T_o$ is a nominal time difference between, for a given nominal frequency of the plurality of different nominal frequencies, the phase measurement at the responder node and the phase measurement at the initiator node, $\eta_r$ is a relative clock reference offset of the responder node clock reference, $\eta_i$ is a relative clock reference offset of the initiator, node clock reference, $f_c$ is a nominal stating frequency of the plurality of different nominal frequencies, $\Delta_f$ is a nominal frequency step in the plurality of different nominal frequencies, assuming a constant frequency stepping, $K_f$ is the number of frequencies in the plurality of different nominal frequencies, F is an optional pre-programmed nominal frequency offset, and $c_0$ is a signal propagation speed.

7. The method of claim 1, wherein calculating the distance between the initiator node and the responder node comprises:
calculating a preliminary distance between the initiator node and the responder node based on the plurality of different nominal frequencies; and
calculating a corrected distance between the initiator node and the responder node based on the nominal distance and the clock reference offset correction.

8. The method of claim 1, wherein calculating the distance between the initiator node and the responder node comprises:
calculating a pre-distortion for the two-way phase measurements based on the clock reference offset correction;
forming a pre-distorted set of two-way phase measurements by applying the pre-distortion to the two-way phase measurements; and
calculating the distance between the initiator node and the responder node based on the pre-distorted set of two-way phase measurements.

9. The method of claim 1, wherein the initiator node clock reference and the responder node clock reference each is controlled by a crystal.

10. The method of claim 1, wherein, in the initiator node and in the responder node, a respective same clock reference controls both a clock timing the phase measurements and a local oscillator generating the carrier signal.

11. The method of claim 1, wherein the initiator node and the responder node are Bluetooth Low Energy devices.

12. The method of claim 1, wherein the initiator node and the responder node comprise IEEE 802.15.4 devices.

13. A method of wireless ranging between an initiator node and a responder node, comprising:
gathering results from two-way phase measurements between an initiator node and a responder node for each nominal frequency in a plurality of different nominal frequencies; and calculating a distance between the initiator node and the responder node using as input:
the results from the two-way phase measurements; and
a clock reference offset correction of the initiator node and of the responder node.

14. A wireless ranging device configured to:
gather results from two-way phase measurements between an initiator node and a responder node for each nominal frequency in a plurality of different nominal frequencies,
calculate a distance between the initiator node and the responder node using as input:
the results from the two-way phase measurements; and
a clock reference offset correction of the initiator node and of the responder node.

15. The wireless ranging device of claim 14, wherein the wireless ranging device is the initiator node.

16. The wireless ranging device of claim 14, wherein the clock reference offset correction is based on a relative clock reference offset difference between a relative clock reference offset of the initiator node clock reference and a relative clock offset of the responder node clock reference.

17. The wireless ranging device of claim 16, wherein the initiator node clock reference and the responder node clock reference each is controlled by a crystal.

18. The wireless ranging device of claim 14, wherein in the initiator node and in the responder node, a respective same clock reference controls both a clock timing the phase measurements and a local oscillator generating the carrier signal.

19. The wireless ranging device of claim 14, wherein the initiator node and the responder node are Bluetooth Low Energy devices.

20. The wireless ranging device of claim 14, wherein the initiator node and the responder node comprise IEEE 802.15.4 devices.

* * * * *